Dec. 28, 1965        G. M. HALLBURG        3,225,471

MOVING SIGN DISPLAY DEVICE

Filed March 8, 1963        3 Sheets-Sheet 1

INVENTOR.
Gerald M. Hallburg,
BY Parker & Carter
Attorneys.

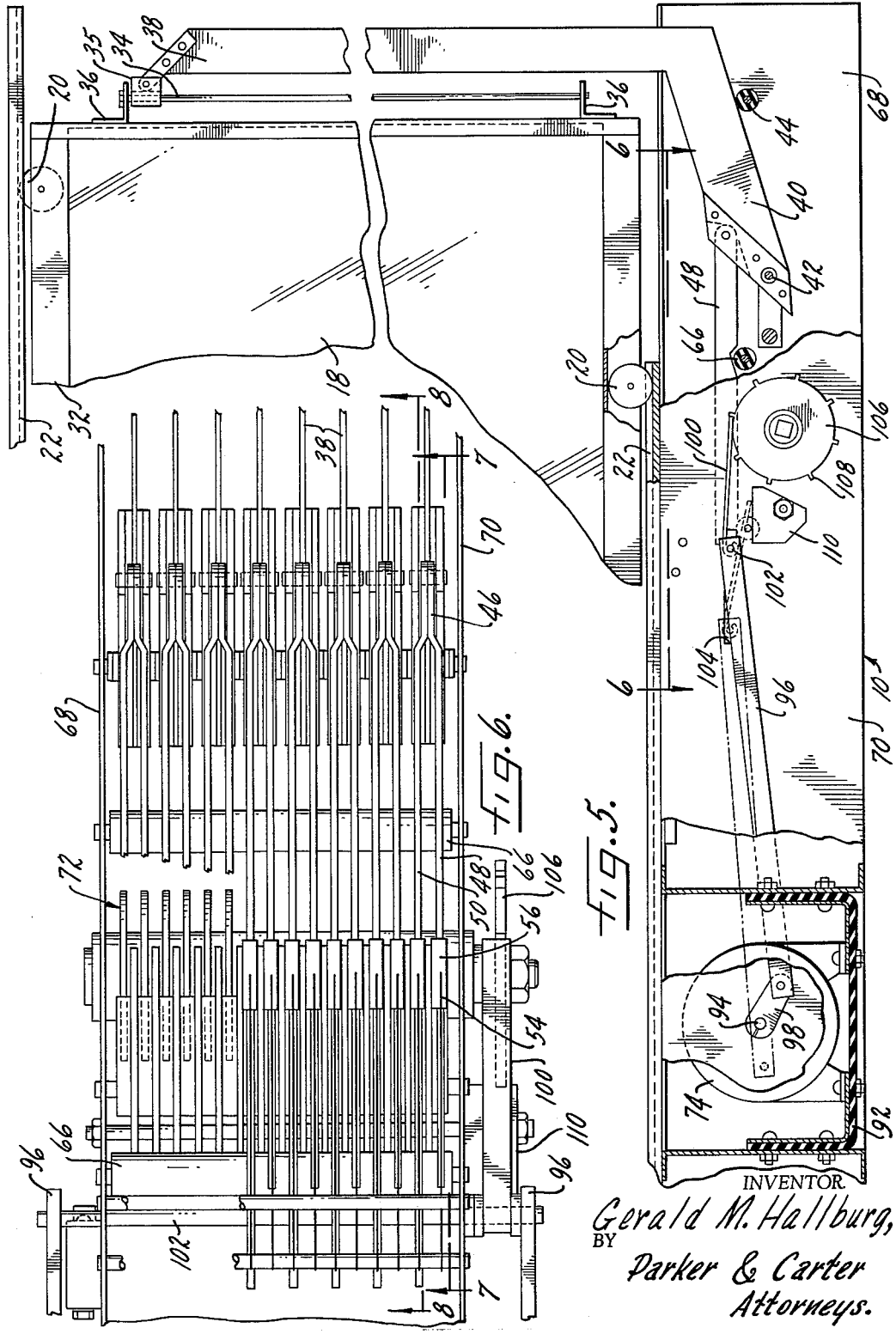

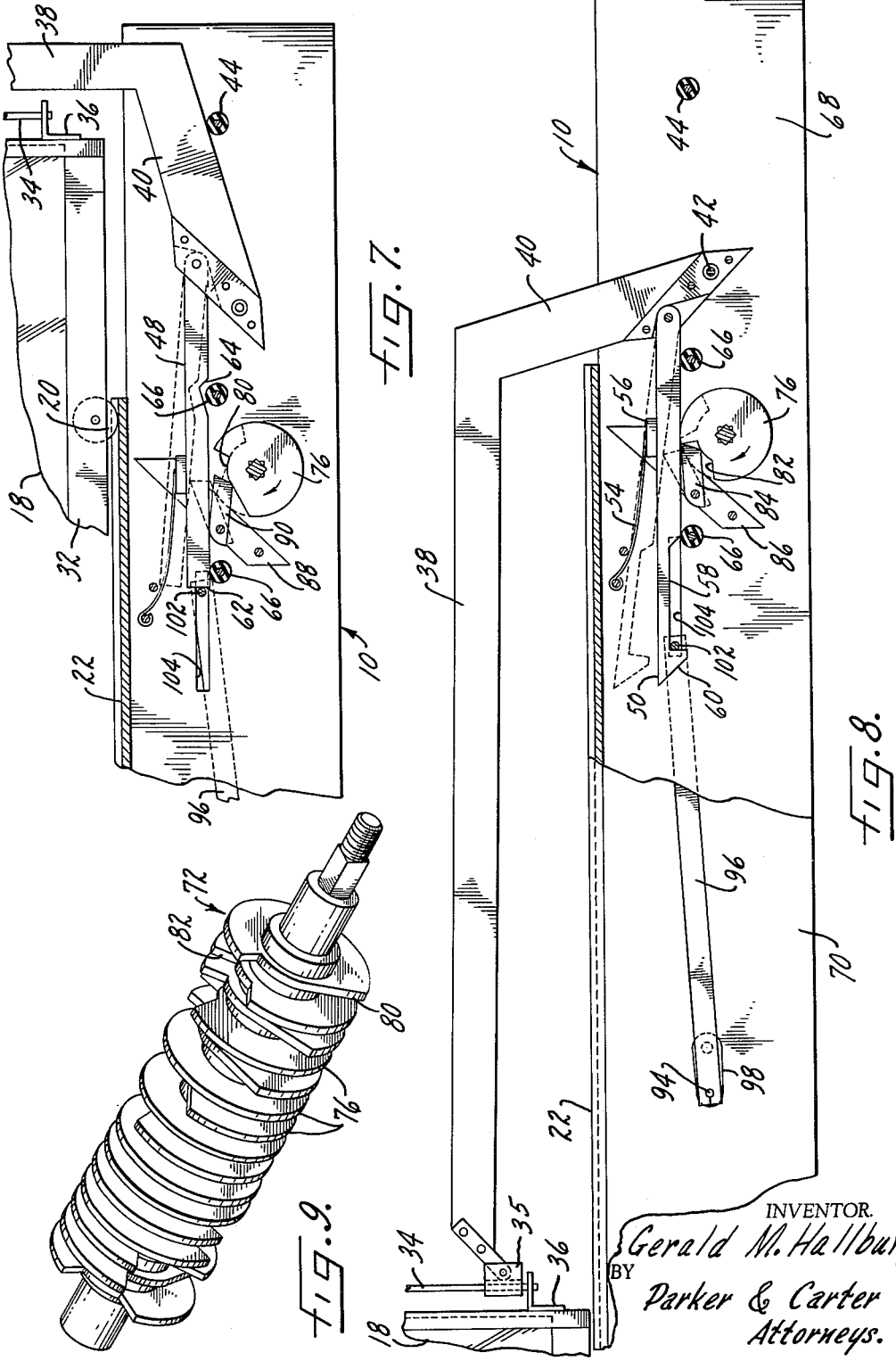

United States Patent Office

3,225,471
Patented Dec. 28, 1965

3,225,471
MOVING SIGN DISPLAY DEVICE
Gerald M. Hallburg, 827 Gardner St., South Beloit, Ill.
Filed Mar. 8, 1963, Ser. No. 263,896
3 Claims. (Cl. 40—36)

This invention relates to a movable sign display device and has for a primary purpose a device of the type described in which a series of signs are sequentially and at timed intervals displayed on a portion of the device.

Another purpose is a display device of the type described in which the displays are changed at periodic timed intervals by means of a clock which constitutes a fixed display.

Another purpose is a display device of the type described having a plurality of displays, and including improved means for sequentially moving these displays into a viewing position.

Another purpose is a display device of the type described which is compact and reliably operable.

Another purpose is a display device of the type described using pivotal arms for moving the various displays into and out of a viewing position.

Other purposes will appear in the ensuing specification, drawings and claims.

The invention is illustrated diagrammatically in the following drawings wherein.

FIGURE 5 is an enlarged partial back view with portions cut away, illustrating the movable display drive means, FIGURE 6 is a section along plane 6—6 of FIGURE 5, FIGURE 7 is a section along plane 7—7 of FIGURE 6, FIGURE 8 is a section along plane 8—8 of FIGURE 6, and FIGURE 9 is a perspective view of the cam structure used in the drive arrangement.

Figure 1:
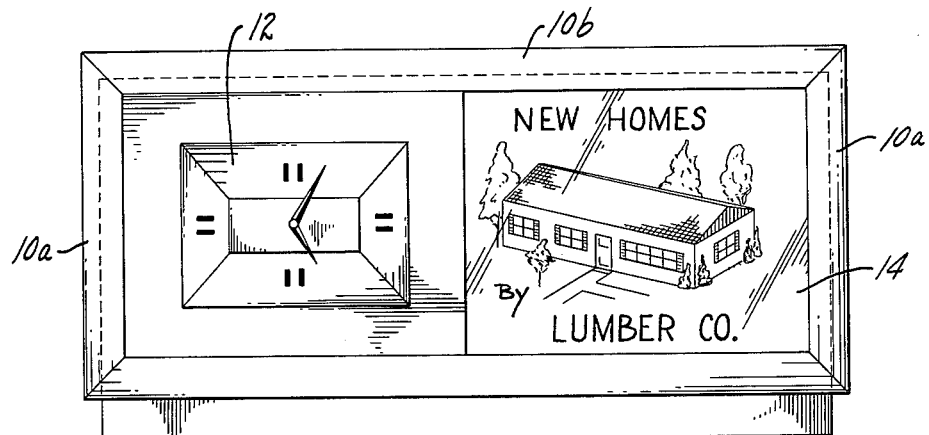
FIGURE 1 is a front plan view of the display device.

Considering FIGURE 1, a frame is indicated generally at 10. The frame includes front frame sections 10a at the sides, and front frame sections 10b, at the top and bottom. Within the frame is mounted a clock 12 which may take any one of a number of conventional forms. Adjacent the clock 12 is a display 14. The invention is particularly concerned with a means for changing the display 14 at periodic intervals.

Figures 2, 3:
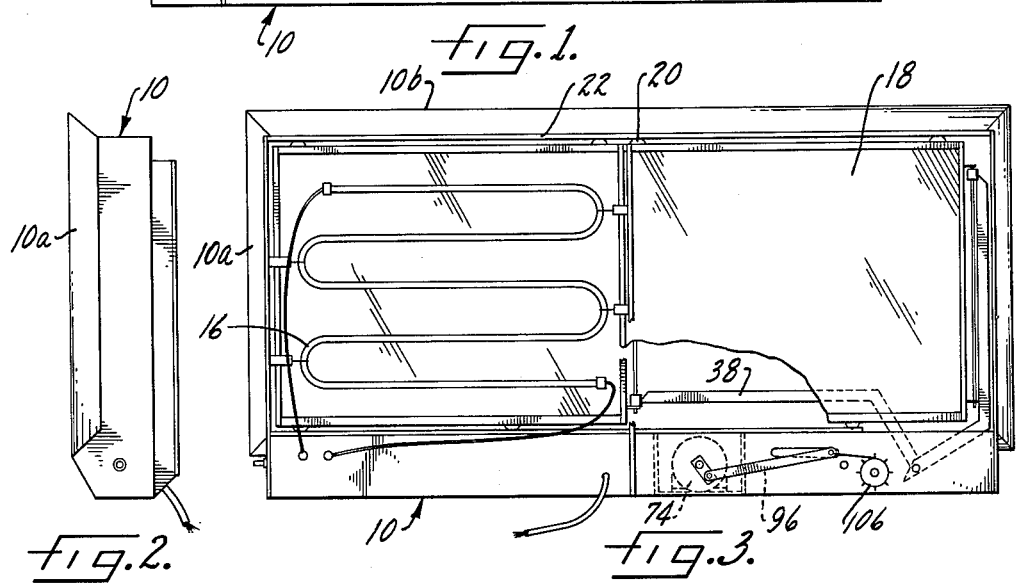
FIGURE 2 is an end view of the display device.
FIGURE 3 is a back view of the display device, with portions cut away.

As illustrated in FIGURE 3, there may be a lighting device 16 at the back of the frame 10 generally behind the display 14. The lighting device may take any one of a number of conventional forms and neon tubes are satisfactory. There are a plurality of displays 18 positioned behind the clock 12 and these displays will be moved back and forth to be visible, as is the display 14 in FIGURE 1. Each of the displays 18 may be mounted on rollers or wheels 20 and there are tracks 22 at the top and bottom of the frame 10 for moving each display from behind the clock to the position shown in FIGURE 1.

Figure 4:
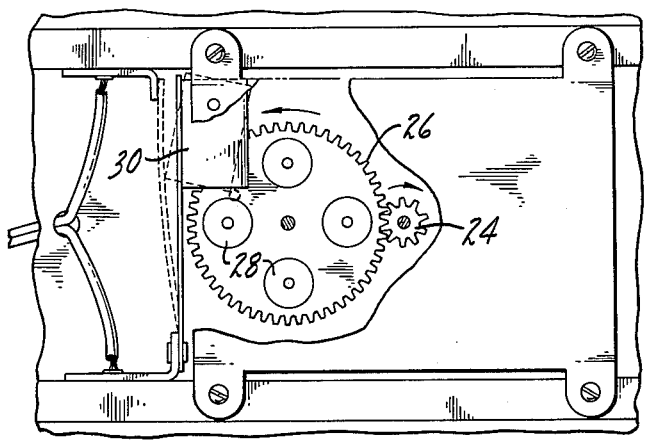
FIGURE 4 is an enlarged back view of a portion of the clock drive means.

The clock drive is illustrated in FIGURE 4. A gear 24 which may be driven in a conventional manner by an electric motor rotates a larger gear 26 having a plurality of slugs or the like 28 positioned around its circumference. The slugs 28 will contact and close an electrical switching mechanism 30 at timed intervals. The switching mechanism 30 is fastened to the clock frame and is adapted to control the drive means for the movable displays as will appear hereinafter.

Each of the movable displays 18 includes a frame 32, illustrated in FIGURE 5, having a rod or the like 34 mounted by brackets 36 at one end. A slide 35 mounts an arm 38 on each rod 34. Each of the arms 38 has a lower inwardly extending portion 40 which is pivotally mounted to the frame 10, as at 42. A rubber bumper or the like 44 may be used to fix the vertical positions of arms 38.

As illustrated in FIGURE 6, each of the arms 38 has a yoke 46 pivotally fastened thereto. Each of the yokes 46 mounts a pair of levers 48 and 50. Note that the yokes 46 are connected to arms 38 at a point spaced from pivot point 42. Movement of each yoke will pivot its connected arm. The levers 48 and 50 extend to the left, as illustrated in the drawings and may be biased in a downward direction by means of small springs or the like 54. The springs are illustrated in FIGURE 8 and each bears down upon spacers 56 which in turn seat upon levers 48 and 50.

Lever 50 extends further to the left than lever 48 and has a notch 58 in the bottom and a slanted forward edge 60 which together with the notch 58 forms a hook on the end of the lever. Lever 48 is square or vertical at the front, as at 62, and has a notch 64 generally intermediate its ends. There are a pair of spaced rubber bumpers 66 extending between the generally parallel walls 68 and 70 which mount the lever structure. The rubber bumpers 66 will hold the levers in predetermined horizontal positions during operation.

A cam structure 72 illustrated particularly in FIGURE 9 is journaled between walls 68 and 70 and is rotated by a drive motor 74 illustrated in FIGURE 5. The cam structure 72 includes a plurality of discs or cams 76 each of which has a notch. It is to be noted that the notches in adjacent discs are different. Considering the first disc illustrated in FIGURE 9, a notch 80 is somewhat elongated, whereas the notch 82 in the second disc is rather short. Normally each of the levers 50 will be in the dotted line position of FIGURE 8. When the particular disc or cam associated with a particular lever 50 reaches the position shown in FIGURE 8, a small latch member 84, of which there is one for each lever, pivotally fastened to a fixed member 86, will fall down into the notch 82 in the cam and allow the lever 50 to drop down to the full line or lower position illustrated in FIGURE 8. Continued movement of that particular cam or disc will eventually raise the lever back up to the dotted line position. This will happen once the notch in the cam forces the small latch member 84 to the up or dotted line position shown in FIGURE 8.

Each of the levers 48 also is associated with a fixed member 88 which has a latch member 90 pivotally attached thereto. When the latch member 90 falls down into notch 80 in the particular cam or disc associated with that lever 48, the lever 48 will be dropped down to the full line position of FIGURE 7. The normal position for the lever 48 is the up or dotted line position of FIGURE 7.

It will be noted from FIGURE 9 that the cams are actually arranged in pairs. Considering the second and third cams from the right-hand end in FIGURE 9, it will be noted that their notches begin at the same spot. The remaining cams will be arranged in pairs with the start of the notches forming somewhat of a helix around the entire cam structure. In this way the cams will sequentially operate the various arms and the movable displays. The first or right-hand cam illustrated in FIGURE 9 actually is paired with the last or left-hand cam. The pair of cams having notches that begin at the same point will cooperate with adjacent movable displays, with one cam being effective to move a display into position to be viewed and the other cam moving the display being viewed back behind the clock. Levers 50 will move the displays from behind the clock into a position to be viewed and levers 48 will move the displays back behind the clock.

The drive motor 74 may have a rubber-like or shockproof mounting 92 and its motor shaft 94 mounts a pair of arms 96. Each of the arms 96 are on the outside of walls 68 and 70 and are eccentrically mounted to the motor shaft 94 through small links or the links 98. The arms 96 extend to the right as illustrated in the drawings, with one of the arms mounting a small rod or the like 100 at its far right-hand end. Mounted between opposite arms 96 is a pull rod or the like 102 which extends between the walls 68 and 70 and is effective to move levers 50 and hence the displays to the left or to the display position. There is a small slot or the like 104 in each of the walls 68 and 70 in which push rod 102 moves. Pull rod 102 will also move levers 48 and the displays back to a position behind the clock.

Mounted on the cam structure 72 and outside of wall 70 is a wheel 106 having a plurality of teeth 108 equally spaced about its periphery. There is a tooth 108 for each sign. The arms 96 and rod 100 will be reciprocated by the motor 74. As shown in FIGURE 5, when the arms 96 move forward, rod 100 will strike one of the teeth 108 and will rotate wheel 106 and hence the cam structure in a clockwise direction. When the arms 96 move backward rod 100 will simply move backward and will lay upon a block 110 when the arm is in the full rearward position indicated by the broken lines of FIGURE 5. The wheel 106 and hence the cam structure will be rotated in steps. Each time the wheel 106 and the cam structure is rotated through a predetermined angular distance there will be a change of signs. The timing of the movement of the wheel 106 and the operation of the motor is controlled by the slugs 28 mounted on the gear 26 which in turn is driven through the clock structure.

The use, operation and function of the invention are as follows:

The ratio between gears 24 and 26 and the number and position of the slugs 28 on the gear 26 is so set that the switch arrangement 30 may be closed at a particular desired interval. For example this may be two minutes. This is only an illustration and the particular time will be dependent upon how often the signs or displays are to be changed. Every time the switch arrangement 30 is closed, motor 74 will be operated and the arms 96 will move forward to rotate the cam arrangement through a predetermined angular distance. As the cam structure rotates and the push rod moves to the right, as shown in FIGURES 7 and 8, a lever 48 will be pushed to the right and will return a pivotal arm 38 to the up position of FIGURE 5. At the same time one of the arms 50 will be dropped down to the full line position of FIGURE 8. The push rod will engage the lever 50 and as it moves back it will draw that particular arm to the position of FIGURE 8 and will hence pivot arm 38 to the down position of FIGURE 8. A sign will be moved over to the left or to the display position. As each sign is moved to the right or back behind the clock, another sign will be moved over to the display position. The pair of discs or cams whose notches begin at the same point are the return cam and the start cam of adjacent signs. Note that as each sign moves over to the display position the arm 38 will slidably move along the rod 34 as the arm pivots from the vertical position of FIGURE 5 to the horizontal position of FIGURE 8.

The drive motor 74 only operates during the period that the switch arrangement 30 is closed and during this period the drive motor will move the cam structure a sufficient distance so that the sign presently in the viewing position will be returned behind the clock and the next sign will be moved to a position to be viewed.

The invention should not be limited to any particular number of signs or to any particular display period.

Whereas the preferred form of the invention has been shown and described herein, it should be realized that there are many modifications, substitutions and alterations thereto within the scope of the following claims.

I claim:

1. In a display device, a frame, a fixed display mounted at one side of said frame, a plurality of movable displays normally positioned on said frame behind said fixed display, and means for sequentially moving each of said movable displays from behind said fixed display to a position adjacent said fixed display, including a track in said frame, each of said movable displays having rolling means for moving on said track, a plurality of arms, one for each movable display, pivotal on said frame, each of said arms being slidably connected to one of said movable displays, drive means, timing means for operating said drive means at fixed intervals, and means connecting said drive means to said arms for sequentially causing said arms to pivot and to move said displays to a viewing position adjacent the fixed display, including a rotatable cam structure having a pair of notched discs for each of said movable displays with the notches in said discs being arranged in a helical pattern, a pair of spaced levers attached to each of said arms, said spaced levers being positioned for movement by said rotatable cam structure, a pull rod operably connected to said drive means and positioned for engagement with said levers, rotation of said notched discs sequentially moving said levers into engagement with said pull rod, said drive means moving said pull rod and the levers in engagement therewith in a path to pivot said arms and move the displays attached thereto.

2. The structure of claim 1 further characterized in that one of the levers in each pair is shorter than the other, the longer of said levers having a hook adapted for operable contact with said pull rod.

3. The structure of claim 1 further characterized in that said fixed display is a clock, said clock being effective to operate said drive means at fixed intervals.

References Cited by the Examiner
UNITED STATES PATENTS

| 378,589 | 2/1888 | Hoisholt | 40—36 |
| 1,707,648 | 4/1929 | Turner et al. | 268—53 |
| 2,995,846 | 8/1961 | Swank | 40—36 |

EUGENE R. CAPOZIO, *Primary Examiner.*

JEROME SCHNALL, *Examiner.*